J. E. MALIVERT.
PRESSURE INDICATOR PROVIDED WITH A SIGNAL DISK.
APPLICATION FILED DEC. 14, 1921.

1,412,698.

Patented Apr. 11, 1922.

INVENTOR
JULES EUGÉNE MALIVERT
BY
ATTORNEYS

UNITED STATES PATENT OFFICE.

JULES EUGÈNE MALIVERT, OF PARIS, FRANCE, ASSIGNOR TO THE SOCIETE ANONYME DES APPAREILS J. E. MALIVERT, OF PARIS, FRANCE.

PRESSURE INDICATOR PROVIDED WITH A SIGNAL DISK.

1,412,698.

Specification of Letters Patent. Patented Apr. 11, 1922.

Application filed December 14, 1921. Serial No. 522,453.

*To all whom it may concern:*

Be it known that I, JULES EUGÈNE MALIVERT, a citizen of France, of 9 and 11 Rue du Télégraphe, Paris, France, have invented a Pressure Indicator Provided with a Signal Disk, of which the following is a full, clear, and exact description.

This invention has for its object an apparatus adapted to indicate, by means of a signal disk, when the pressure within a reservoir or a piping is maintained below a predetermined critical value or reaches the latter.

The invention consists in a special device for controlling the signal disk and so combined as to ensure a complete protection of the mechanism when the pressure exceeds the value for which the apparatus has been adjusted and to permit by a very simple operation the adjustment of the initial position of the signal disk and of the maximum pressure at which the apparatus must operate.

This apparatus is essentially characterized by the following combination:

(*a*) A main body having a chamber of variable capacity, in communication with the reservoir or the conduit-pipe containing the fluid under pressure, and closed at its upper part by a flexible diaphragm pressed by a spring against the convex surface of a piston, movable in a bore of determined height, turned in the lathe in an inner recess of this main body, this piston being subjected to the action of an antagonistic spring the tension of which may be adjusted and taking a bearing on a nut screwed in the inner recess;

(*b*) A movable device comprising the signal disk, the mounting in which it rotates, its returning spring and the members adapted to transmit the movement to the signal disk; this device resiliently rests on springs and is secured by means of screws screwed in the upper part of the main body. The said device allows, by screwing and unscrewing these screws, of adjusting the distance separating the signal disk from the piston, so as to bring the transmission mechanism in contact with this piston and thus of adjusting the initial;

(*c*) A valve arranged in the fluid inlet branch and so mounted as to constantly follow the movements of the diaphragm and of the piston and to cut off the admission of fluid as soon as its pressure reaches a predetermined limit.

The accompanying drawing illustrates, by way of example, a form of execution of this indicator provided with a signal disk.

Figure 1:
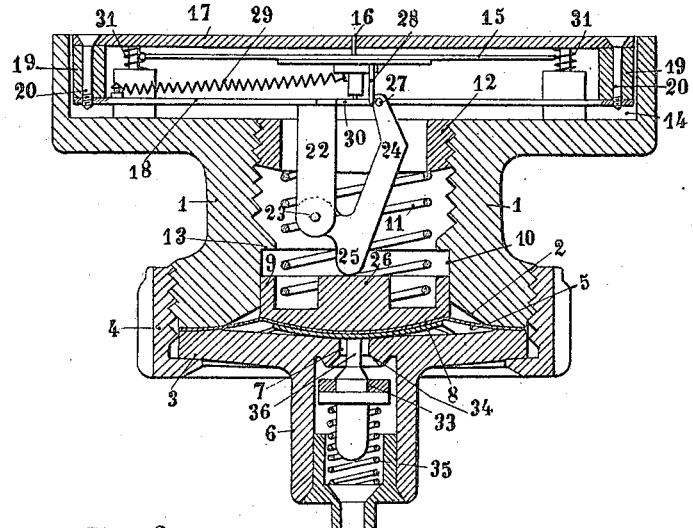
Fig. 1 is a vertical section made according to line A—A of Fig. 2.

As illustrated in the drawing, the present apparatus comprises a main body 1 of tubular shape and the lower face 2 of which has a concave or conical shape; this body 1 is closed at its base by a bottom 3, which is held in place by the screwing of a milled nut 4. The chamber comprised between this bottom 3 and the concave face 2 of the main body is closed at its upper part, in a perfect fluid-tight manner, by a flexible diaphragm, for instance made of oiled silk, clamped on its periphery between the main body 1 and the bottom 2.

The bottom 3 carries a nozzle 6 on which fits the pipe or union through which the apparatus is put in communication with the reservoir or the piping containing the fluid under pressure; at the center of this bottom 3 is provided a hole 7 through which this fluid can be admitted in the chamber comprised between this bottom 3 and the flexible diaphragm 5.

This diaphragm 5 is pressed by a star spring 8, having three branches for instance, taking a bearing on the bottom 3, against the convex face of a piston 9 movable in a bore 10 turned in the inner recess of the main body 1; this piston 9 is adapted to transmit to the signal disk, as will be described hereafter, the movements received by the diaphragm 5 under the effect of the differences of pressure to which it is subjected.

The piston 9 receives the action of an antagonistic spring 11, taking a bearing against a nut 12 screwed within the central recess of the body 1; by screwing or unscrewing this nut, it is possible to adjust at will the initial tension of the spring 11, according to the pressures to which the apparatus is to be subjected.

The main body 1 is moreover provided, above the bore part 10, with a shoulder 13 adapted to limit the upward stroke of the piston 9, so that the mechanism is locked at the time the maximum pressure (for which the apparatus is adjusted) is reached and that any disarrangement and deterioration are thus rendered impossible.

The main body 1 is provided at its upper part with a cup 14 adapted to receive the indicating device.

This indicating device comprises a signal member constituted by a disk 15 which is mounted on a movable axis 16 between two plates 17, 18 connected together and held at a suitable distance apart by stays 19 and screws 20. The upper plate 17, in the shape of a disk, is provided with windows 21 through which the signal disk 15 is exposed. The lower plate 18, constituted by a flat band (Fig. 3), carries, on its lower face, a pillar 22 to the lower end of which is hinged, about an axis 23, the small arm of a bent lever 24.

In its bent part, this lever is provided with a heel-piece 25, which, as stated hereafter, must be brought in contact with a central boss 26 of the piston 9. The long arm of this lever carries at its end a pin 27 against which is pressed another pin 28 secured on the lower face of the signal disk and forming a crank pin. The contact of the pin 28 with the pin 27 is constantly ensured by the action of a returning spring 29 secured, on the one hand, to the lower plate 18 and, on the other hand, to the signal disk 15.

Figure 3:
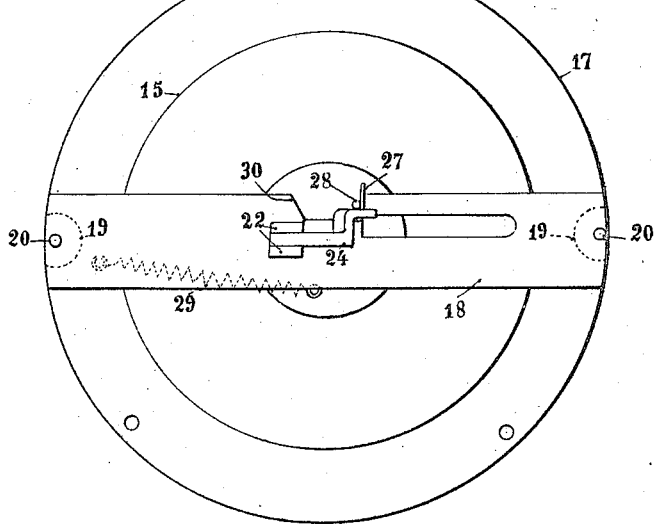
Fig. 3 is an underside view of the movable device carrying the signal disk.
Figure 2:
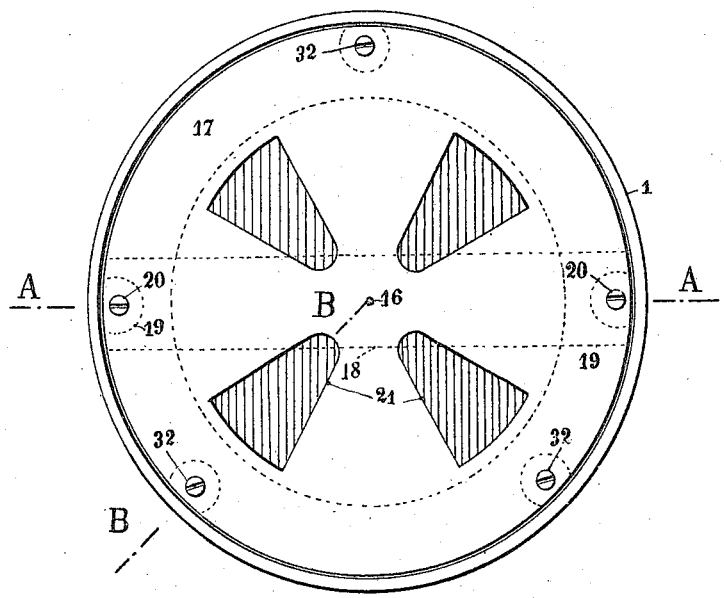
Fig. 2 is a top plan view.

A notch 30 is formed in the lower plate 18, as shown in Figs. 1 and 3, for the purpose of permitting the passage of the upper end of the lever 24 in its rocking movement; in the position of rest of the signal disk, this upper end of the lever 24 abuts against one of the edges of the notch 30, as shown in the drawing.

Figure 4:
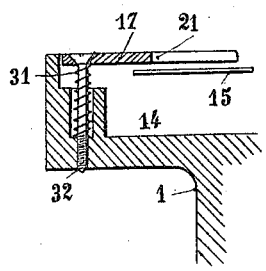
Fig. 4 is a partial vertical section made according to line B—B of Fig. 2.

The whole of the plates 17, 18, signal disk 15, its returning spring 20 and its control lever 24 forms a device which is removably and adjustably mounted in the cup 14 arranged at the upper part of the main body 1. For that purpose, the upper plate 17 rests, as shown in Fig. 4, on coil springs 31 and is held by means of screws 32 passing in these coil springs and screwed in the part forming a cup of the main body 1.

This arrangement allows by a suitable screwing of the screws 32, of adjusting in a very accurate manner the level of the signal disk 15 within the apparatus, so as to always obtain the putting in contact of the lever 24 with the boss 26 of the piston 9, whatever may be the differences in the machining which may exist in the course of the manufacture.

Moreover, the removability of the signal disk and of its connected parts allows to have readily access to the nut 12 and of thus adjusting the tension of the antagonistic spring 11 according to the maximum pressure to which the apparatus is to be subjected.

The apparatus comprises moreover a pressure limiting device adapted to prevent the fluid under pressure from passing under the diaphragm 5 as soon as the maximum pressure (for which the apparatus is adjusted) is reached and of thus avoiding any deterioration or disarrangement of the apparatus.

This pressure limiting device is constituted by a valve 33 mounted within the nozzle 6, so as to constantly follow the displacements of the diaphragm 5 and of the piston 9 and to fit on a seat 34 concentric to the central hole 7 of the bottom 3, when the piston 9 has been pushed back to the top of its stroke. For that purpose, this valve, urged by a returning spring 35, carries a rod 36 passing through the central hole 7 and the end of which is constantly held in contact, by the action of this spring, with the central part of the star spring 8 which presses the diaphragm 5 against the convex face of the piston 9. The length of the rod 36 is so determined that the stroke necessary for the closing of the valve 33 is equal to the total rising movement of the diaphragm 5 and piston 9, necessary for producing the desired angular displacement of the signal disk 15 opposite the openings 21 of the upper plate 17.

The operation of this apparatus is the following:

The fluid under pressure, admitted through the nozzle 6 in the chamber comprised between the bottom 3 and the diaphragm 5, acts upon this diaphragm and pushes back the piston 9, compressing at the same time the antagonistic spring 11; the piston 9, in its upward movement, causes the lever 24 to pivot about its axis 23, the end of the long arm of this lever acts through the pin 27 on the pin 28 of the signal disk 15 and thus imparts an angular displacement to the latter, which cause to appear, in front of the openings 21 of the upper plate, coloured sectors it carries on its upper face.

When the pressure reaches its maximum value, on the one hand, the piston 9 abuts against the shoulder 13 and the driving mechanism of the signal disk is immobilized, on the other hand, the valve 33 fits upon its seat 34 and cuts off the communication between the apparatus and the piping containing the fluid under pressure, so as to preserve the diaphragm 5 from the action of a too high pressure capable of deteriorating it.

When the pressure diminishes, the piston 9, under the action of the spring 11 moves down, pushing back the valve 33, the communication is then re-established between the apparatus and the piping containing the fluid under pressure; at the same time, the signal disk 15, urged by its returning spring 29 moves backward.

By its special combination, the present apparatus has the double advantage of being preserved from any deterioration and disarrangement when it is subjected to a pressure exceeding a given limit, and of permitting, by a very simple operation, the adjustment of its setting to zero and of the maximum pressure at which it must operate.

Claims—

1. A pressure indicator provided with a signal disk, comprising in combination: a main tubular body,—a chamber of variable capacity, provided with a flexible diaphragm,—means for causing the said chamber to communicate with a conduit-pipe containing a fluid under pressure,—a piston movable in the tubular body,—an abutment adapted to limit the upward stroke of this piston,—an antagonistic spring abutting, on the one hand, against the said piston and, on the other hand, against a nut screwed within the main body,—a removable device comprising an upper plate having the shape of a disk and provided with openings, a lower plate stayed with the preceding plate, a signal disk mounted on a movable axis between these two plates and urged by a returning spring, and a bent lever having arms of unequal lengths, the short arm being pivoted on a support carried by the lower stay and the long arm being so arranged as to act on a pin forming a crank-pin carried by the lower face of the signal disk, a heel-piece presented by the bent portion of the said lever arranged in such a manner as to be in contact with the upper face of the piston,—a cup arranged at the upper part of the main body for receiving the said removable device,—means for adjustably mounting the said removable device in this cup.

2. A pressure indicator provided with a signal disk, comprising in combination: a main tubular body,— a chamber of variable capacity, provided with a flexible diaphragm,—means for causing the said chamber to communicate with a conduit-pipe containing a fluid under pressure,—a piston movable in the tubular body,—an abutment adapted to limit the upward stroke of this piston,—an antagonistic spring abutting, on the one hand, against the said piston and, on the other hand, against a nut screwed within the main body,—a removable device comprising an upper plate having the shape of a disk and provided with openings, a lower plate stayed with the preceding plate, a signal disk mounted on a movable axis between these two plates and urged by a returning spring, and a bent lever having arms of unequal lengths, the short arm being pivoted on a support carried by the lower stay and the long arm being so arranged as to act on a pin forming a crank-pin carried by the lower face of the signal disk, a heel-piece presented by the bent portion of the said lever arranged in such a manner as to be in contact with the upper face of the piston,—a cup arranged at the upper part of the main body for receiving the said removable device,—means for adjustably mounting the said removable device in this cup,—a valve arranged within the nozzle through which the fluid under pressure is admitted in the chamber of variable capacity,—a rod forming an extension of the valve rod,—and means permitting the said rod and the valve to follow the movements of the diaphragm and of the piston, so that this valve is closed when the piston has reached the top of its stroke.

The foregoing specification of my pressure indicator provided with a signal disk, signed by me this first day of December, 1921.

JULES EUGÈNE MALIVERT.